United States Patent [19]
Pierce

[11] Patent Number: 5,377,579
[45] Date of Patent: Jan. 3, 1995

[54] FLUID-OPERATED SPRING BRAKE ATUATOR WITH FUNNEL-SHAPED PRESSURE PLATE

[75] Inventor: William C. Pierce, Muskegon, Mich.

[73] Assignee: NAI Anchorlok, Inc., Muskegon, Mich.

[21] Appl. No.: 78,734

[22] Filed: Jun. 15, 1993

[51] Int. Cl.6 .......................... F01B 7/00; F01B 19/00
[52] U.S. Cl. ......................................... 92/63; 188/170; 92/99
[58] Field of Search .......................... 92/63, 99, 130 A; 188/170

[56] References Cited

U.S. PATENT DOCUMENTS

| 3,083,698 | 4/1963 | Price et al. | 92/48 |
| 3,182,566 | 5/1965 | Berg et al. | 92/24 |
| 3,811,365 | 5/1974 | Gordon et al. | 92/63 |
| 4,406,213 | 9/1983 | Haar | 92/376 R |
| 5,105,727 | 4/1992 | Bowyer | 92/63 |
| 5,279,325 | 1/1994 | Kaspers | 92/59 X |

Primary Examiner—Edward K. Look
Assistant Examiner—John Ryznic
Attorney, Agent, or Firm—Varnum, Riddering, Schmidt & Howlett

[57] ABSTRACT

A fluid-operated spring brake actuator has a funnel-shaped pressure plate which reduces the volume of fluid necessary to compress the spring and release the brake thereby providing a faster response time upon actuation of the brake.

20 Claims, 2 Drawing Sheets

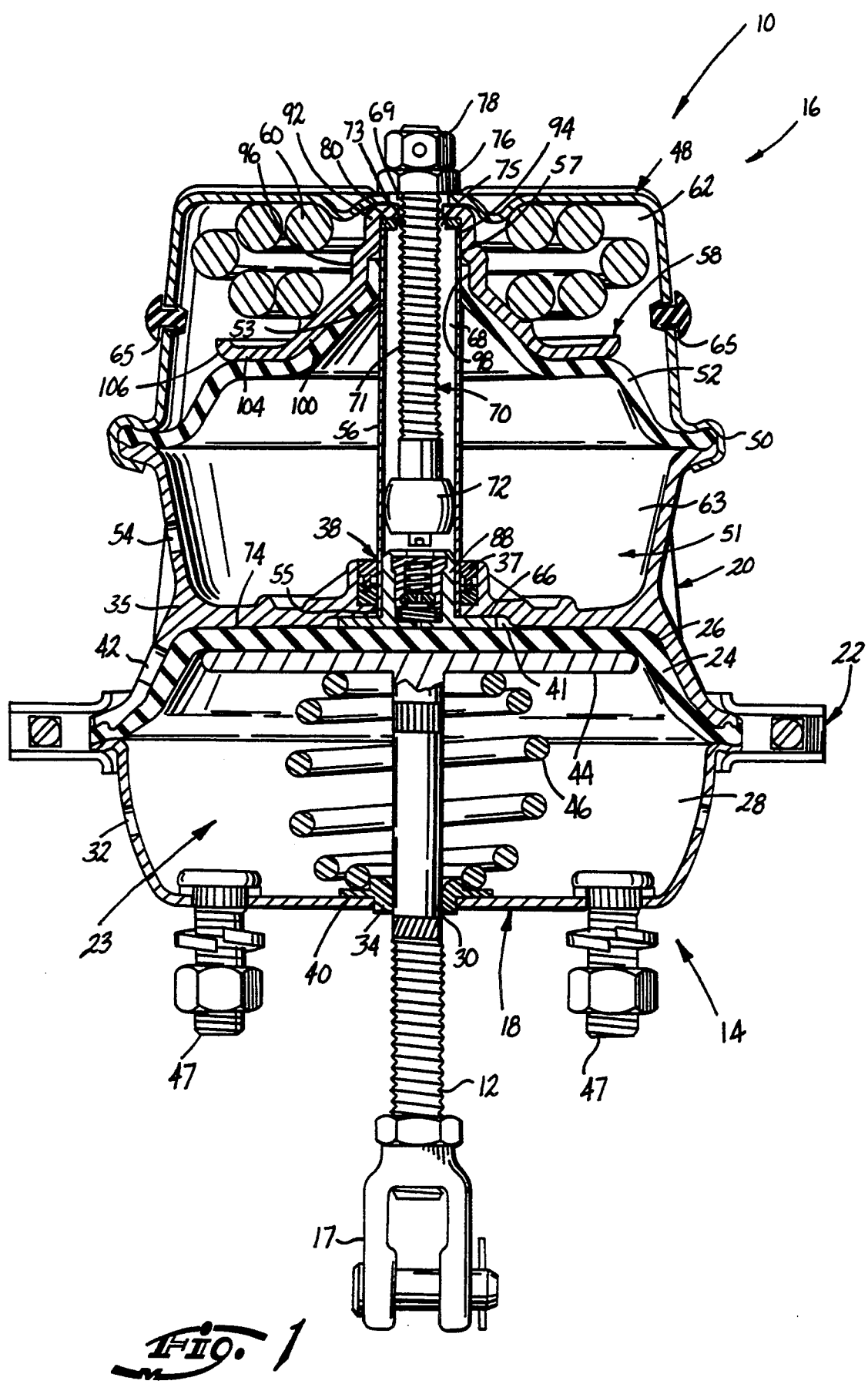

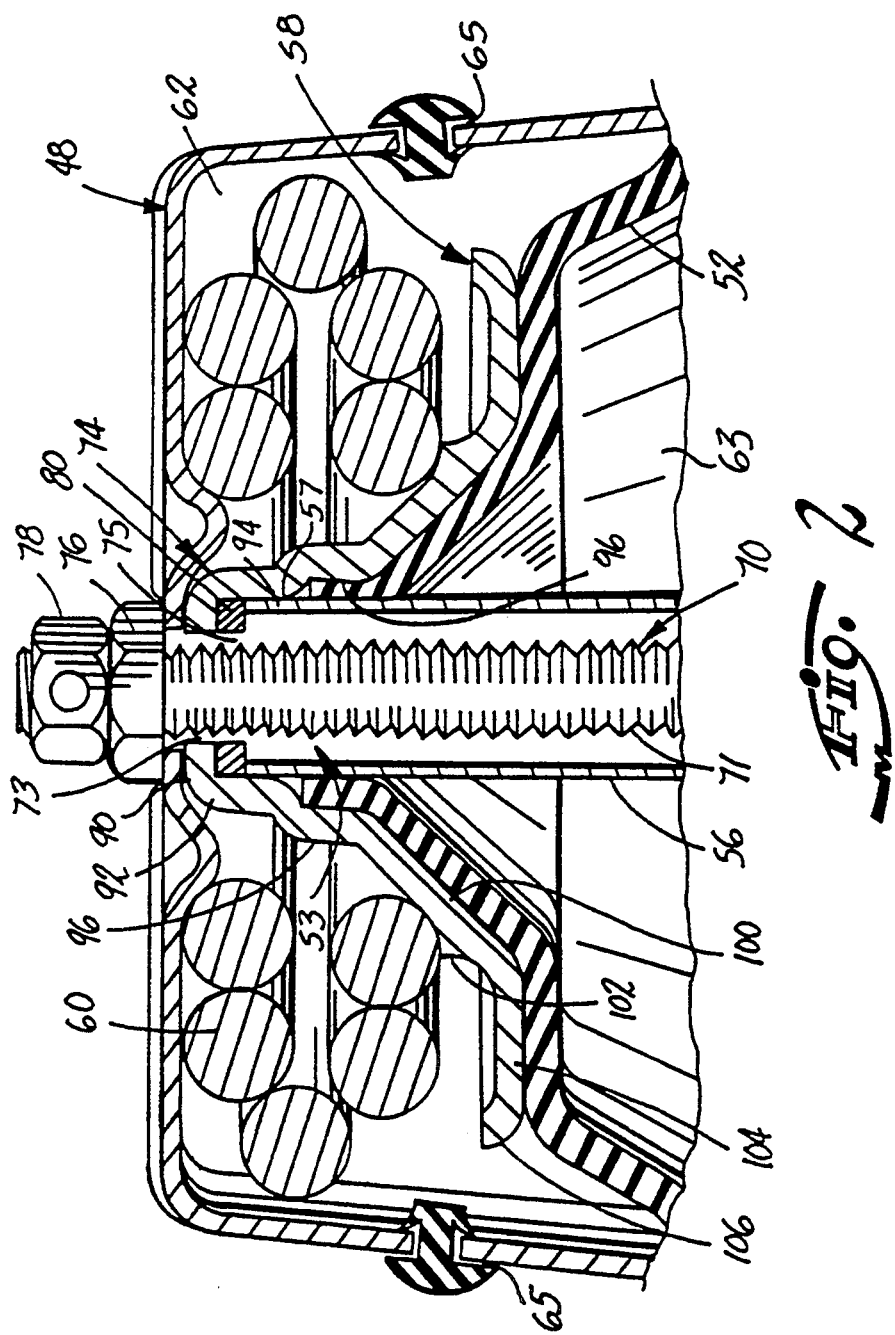

FLUID-OPERATED SPRING BRAKE ATUATOR WITH FUNNEL-SHAPED PRESSURE PLATE

BACKGROUND OF THE INVENTION

1. Field of the Invention

The invention relates to fluid-operated brake actuators for vehicles and more particularly to service and spring brake actuators combined in tandem and having an improved spring brake pressure plate.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator for actuating the brakes when the compressed air is released. The emergency brake actuator includes a strong compression spring which forces application of the brake when air is released. This actuator is often referred to as the spring brake. Typically, the spring brake actuator is disposed in tandem with the service brake actuator.

The service brake actuator is typically divided into two chambers by a diaphragm. Depressing the brake pedal during normal driving operation introduces into one of the chambers of the service brake actuator compressed air which, acting against the diaphragm, causes a service brake push rod in the opposite chamber to be extended and the brakes to be applied with an application force proportional to the air pressure in the service brake actuator.

In tandem actuator assemblies, a spring brake push rod typically extends from a chamber in the spring brake portion, through an aperture in a wall separating the spring brake actuator from the service brake actuator, and into a chamber in the service brake portion. Because at least one of the adjoining chambers is usually pressurized, a seal is provided at the aperture around the push rod comprising one or more O-rings positioned in annular channels in the wall around the aperture.

The spring brake actuator is typically divided into two chambers, a lower chamber and an upper chamber, separated by a rubber diaphragm and pressure plate, with the spring in the upper chamber acting between an end wall of the spring brake housing and a pressure plate. When full pressure is applied to the lower chamber, air pressure acting against the diaphragm and pressure plate compresses the spring. In many applications, the spring brake actuator rod is held in a retracted position by a relatively small return spring. In some actuators, the spring brake actuator rod is integral with the pressure plate and held in a retracted position by the air pressure. In both designs, the spring brake actuator rod thus does not affect the normal operation of the brake.

In the event of a loss of air pressure or an intentional exhaustion of air from the spring brake actuator, the brake will be mechanically activated by the force of the strong compression spring acting on the spring brake actuator rod which, in turn, acts upon the service brake push rod to apply the brakes. Thus, the spring brake portion serves both as a parking brake and an emergency brake.

The volume of air in the lower chamber of the spring brake actuator is related to the response time of the spring brake. The response of the spring brake is the time it takes the spring to force the spring brake push rod the necessary distance to activate the brakes after air pressure to the lower chamber is lost. For a given air pressure, the greater the volume of the lower chamber, the longer the response time for the application of the spring brake, after the air is released. Therefore, it is desirable to reduce the volume of air in the lower chamber of the spring brake to decrease the time for the application of the spring brake after the air is released. However, the volume of the lower chamber cannot be reduced by merely reducing the size of the spring brake actuator because the spring must be of sufficient size to stop the vehicle and the spring must travel a sufficient distance so the complementary travel of the push rod is sufficient to actuate the brake.

SUMMARY OF THE INVENTION

The invention is a fluid-operated diaphragm spring brake actuator having a housing divided into a first and second chamber by an elastomeric diaphragm suspended within the housing. An aperture is disposed in the central portion of the diaphragm. A pressure plate is mounted in the first chamber and supports a spring mounted between the pressure plate and the housing. An actuator rod is disposed within the second chamber and actuates a brake mechanism in response to movement of the diaphragm and pressure plate. The pressure plate is preferably funnel-shaped and has a tubular portion adjacent one end of the actuator rod and a flared portion extending obliquely from the tubular portion so the volume of fluid in the second chamber is reduced to provide a faster response for the spring brake actuator when the fluid is exhausted from the second chamber.

Preferably, the flared portion of the pressure plate terminates in a radially outward directed flange and the actuator rod is press-fit within the tubular portion of the pressure plate. The radially outward directed flange also can have an upturned lip at its peripheral edge. The flared portion can have a seat intermediate the tubular portion and the radially outward directed flange on which is supported the spring.

Preferably, the actuator rod is hollow and the tubular portion has an aperture through which a caging tool extends. The caging tool further extends into the hollow actuator rod.

BRIEF DESCRIPTION OF THE DRAWINGS

FIG. 1 is a cross-sectional view of an air-operated brake actuator with the pressure plate according to the invention; and FIG. 2 is an enlarged sectional view of the pressure plate of FIG. 1.

DETAILED DESCRIPTION OF THE DRAWINGS

FIG. 1 illustrates a fluid-operated brake actuator 10. The fluid-operated brake actuator 10 comprises a service brake actuator 14 mounted in tandem to a spring or emergency brake actuator 16. A service brake push rod 12 extends from the service brake actuator 14 for reciprocating movement between a retracted position and an extended, actuating position relative to the service brake actuator 14, and is provided with a clevis 17, which is adapted to connect to a conventional brake shoe and drum (not shown) in a standard fashion. Reciprocating motion of the service brake push rod 12 will cause the brake to be alternately applied and released.

The service brake actuator 14 comprises a cup-shaped service housing section 18 and a double cup-shaped adapter housing 20 joined together by a clamp 22 to form a service brake chamber 23. The adapter housing 20 is also sometimes known as a flange case.

A first elastomeric diaphragm 24 (also known as the service brake diaphragm) is suspended within the service brake chamber 23, the peripheral edge thereof is secured in fluid tight enclosure between the cup-shaped service housing section 18 and the service side of the adapter housing 20 by the clamp 22. The first elastomeric diaphragm 24 thus separates the service brake chamber 23 into two portions: an upper service brake chamber 26 and a lower service brake chamber 28. The upper service brake chamber 26 communicates with a source of pressurized air (not shown) through an air service port 42 in the adapter housing 20. The lower service brake chamber 28 is vented to the atmosphere through at least one opening 32 in the cup-shaped service housing section 18. In FIG. 1, the upper service brake chamber 26 is shown evacuated so that the first elastomeric diaphragm 24 is forced against the adapter housing 20 because of the force from spring 46 in the lower service brake chamber 28.

The service brake push rod 12 extends through a central opening 30 in the cup-shaped service housing section 18 and has a pressure plate 44 at the end thereof within the lower service brake chamber 28. The pressure plate 44 bears against the first elastomeric diaphragm 24. A compression spring 46 extends between the pressure plate 44 and the interior surface of the cup-shaped service housing section 18. A push rod guide 34 having an annular seat 40 is disposed within the central opening 30 to guide reciprocal movement of the service brake push rod 12 within the central opening 30 and also to receive the end of the compression spring 46 and retain it in position around the central opening 30. The compression spring 46 thus urges the pressure plate 44 and the service brake push rod 12 to a fully retracted position as depicted in FIG. 1.

To operate the service brake, compressed air is introduced through the air service port 42 into the lower service brake chamber 28 to create a force against the first elastomeric diaphragm 24 and pressure plate 44 sufficient to overcome the force of the compression spring 46, thereby extending the service brake push rod 12 toward the actuating position. The opening 32 permits rapid evacuation of air from the lower service chamber section 23 as the service brake is actuated. Mounting studs 47 are provided to mount the fluid-operated brake actuator 10 onto a vehicle (not shown).

The spring chamber or emergency brake actuator 16 is defined by the spring side of the adapter housing 20 and a generally cylindrical head 48 or spring chamber, which is clamped to the spring side of the adapter housing 20 by a clamp 50 to form the spring brake chamber 51. A second elastomeric diaphragm 52, known as the spring diaphragm, is suspended within the spring brake chamber 51, the peripheral edge thereof secured in fluid tight enclosure between the cylindrical head 48 and the spring side of the adapter housing 20 by the clamp 50. The second elastomeric diaphragm 52 thus separates the spring brake chamber 51 into two chambers: an upper spring brake chamber 62 and a lower spring brake chamber 63. The lower spring brake chamber 63 is filled with pressurized air supplied through an air service port 54 in the adapter housing 20 when the emergency brake is in its normal released position as depicted in FIG. 1.

The adapter housing 20 includes a divider wall 35 which separates the adjoining service brake chamber 23 and spring brake chamber 51. A spring brake actuator rod 56, aligned with the service brake push rod 12, has one end extending from the spring brake chamber 51 through a central opening 38 in divider wall 35 for reciprocating motion through the central opening 38 between a retracted position and an actuating position. One or more O-ring seals 37 are provided in the central opening 38 through which the spring brake actuator rod 56 reciprocates.

A distal end 55 of the spring brake actuator rod 56 terminates in a reaction plate 66 in the upper service brake chamber 26. The reaction plate is received in an annular recess 41 when the spring brake actuator rod 56 is in the retracted position as depicted in FIG. 1. An opposite, proximal end 57 of the actuator rod 56 extends through an opening 53 in the second elastomeric diaphragm 52 and terminates in a pressure plate 58 according to the invention and described in greater detail below. The pressure plate 58 abuts an end of a large force compression spring 60.

The spring brake actuator rod 56 is a hollow tube or rod provided with a central bore 68 to accommodate a brake release rod or caging tool 70. The central bore 68 of the spring brake actuator rod 56 receives the caging tool 70, which passes through aligned apertures 69, 73, and 75 in the cylindrical head 48, pressure plate 58 and spring brake actuator rod 56, respectively. The, caging tool 70 comprises a threaded elongated shaft 71, with one end having an enlarged head portion 72. The opposite end of the caging tool 70 is threaded through a head nut 76 fixedly mounted to the cylindrical head 48, and has a hex head nut 78 or similar driver fixedly secured thereto.

The caging tool 70 primarily serves to enable manual retraction of the powerful compression spring 60. Rotation of the hex head nut 78 threads the shaft 71 through the head nut 76, to axially move the caging tool 70 with respect to the cylindrical head 48. The head portion 72 slides freely within the central bore 68 of the actuator rod 56, yet is restrained by an inwardly directed annular flange 80 at the actuator rod proximal end 57. Thus, withdrawal of the caging tool 70 by rotation of the hex head nut 78, causes the head portion 72 to abut the flange 80, and retract the pressure plate 58 and spring 60.

The cylindrical head 48 includes one or more ports 65 therein which establish communication between the upper spring chamber portion 62 and the atmosphere.

Referring more specifically to FIG. 2 and generally to FIG. 1, the pressure plate 58 in accordance with the invention is generally funnel-shaped and comprises a tubular portion 74 at the neck of the funnel. The tubular portion 74 is stepped and comprises a radially inwardly directed annular flange 90 and a first cylindrical section 92. The radially inwardly directed annular flange 90 defines the aperture 73 through which passes the shaft 71 of the caging tool 7(i. The first cylindrical section 92 is adjacent the actuator rod 56 and has an inner wall 94 shaped and sized to receive the actuator rod proximal end 57 in press-fit engagement. A second cylindrical section 96 of the tubular portion 74 is stepped outwardly relative to the first cylindrical section 92 and clamps the annular edge defining the opening 53 of the elastomeric diaphragm 52 securely against the actuating rod 56.

The pressure plate 58 further comprises a flared portion 100 extending obliquely from the tubular portion 74 and toward the divider wall 35, flaring outwardly from the actuator rod 56. The flared portion 100 terminates in a radially outwardly directed flange 104. An annular seat 102 for holding the compression spring 60 is located on the flared portion 100 intermediate the flange 104 and the tubular portion 74. The flange 104 terminates in an upturned portion 106, which prevents the diaphragm 52 from catching on the pressure plate 58 during reciprocation.

Air pressure in the lower spring brake chamber 63 normally keeps the diaphragm 52 pressed against the contour of the pressure plate 58. It can be seen, however, that the improved funnel-shape of the pressure plate 58 results in the volume of the lower spring brake chamber 63 being significantly less than in prior art brake actuators where the pressure plate extends generally normally from the actuator rod 56 and directly abuts the spring 60. In other words, the flared portion of the pressure plate projects toward the divider wall and away from the end of the spring 60 thereby making the maximum volume of the lower spring brake chamber 63 smaller. Yet, the length of the actuator rod 56 and hence the maximum amount of stroke remains standard. Similarly, the size of the spring 60 is standard. Preferably, the reduction in maximum volume of the lower spring brake chamber 63 approximately 20 to 30 percent over prior air brakes actuators. This lesser volume of the lower chamber results in a highly desireable quicker response time because less air must be exhausted from the lower spring brake chamber during the stroke.

During normal operation of the fluid-operated brake actuator 10, the spring brake actuator rod 56 will be in the fully retracted position, as depicted in FIG. 1, by means of compressed air which is maintained in the lower spring brake chamber 63. When the compressed air is exhausted from the lower spring brake chamber 63, the compression spring 60, one end of which abuts the outer end wall of the cylindrical head 48, forces the integral pressure plate 58 and spring brake actuator rod 56 in the direction of the service brake push rod 12. The force of the compression spring 60 causes the spring brake actuator rod 56 to be extended through the central opening 38, thereby causing the reaction plate 66 to apply a force to the first elastomeric diaphragm 24 and pressure plate 44 of the brake actuator 14. This action causes the service brake push rod 12 to be extended toward the actuating position, thereby applying the brake (not shown). When the spring brake actuator 16 is to be released, compressed air is once again introduced into the lower spring brake chamber 63 to a pressure sufficient to overcome the force of the compression spring 60. The force of the compressed air against the second elastomeric diaphragm 52 causes the pressure plate 58, the spring brake actuator rod 56 and the compression spring 60 to be returned to the position depicted in FIG. 1.

Reasonable variation and modification are possible within the scope of the foregoing disclosure without departing from the spirit of the invention which is defined in the accompanying claims.

The embodiments for which an exclusive property or privilege is claimed are defined as follows:

1. In a fluid-operated diaphragm spring brake actuator, having a housing, an elastomeric diaphragm suspended in the housing to divide the interior thereof into first and second chambers, a pressure plate adjacent to the diaphragm in the first chamber, a spring in the first chamber between the pressure plate and the housing, and an actuator rod in the second chamber for actuating a brake mechanism in response to movement of the diaphragm and pressure plate, the improvement wherein:

the pressure plate is funnel-shaped, having a tubular portion adjacent to the actuator rod at an end of the actuator rod in the first chamber and a flared portion extending obliquely from the tubular portion, whereby the volume of fluid in the second chamber can be reduced to provide a faster response to the spring brake actuator.

2. A fluid-operated diaphragm spring brake actuator according to claim 1 wherein the flared portion terminates in a radially outwardly directed flange.

3. A fluid-operated diaphragm spring brake actuator according to claim 2 wherein the actuator rod is press fit within the tubular portion.

4. A fluid-operated diaphragm spring brake actuator according to claim 3 wherein the radially outwardly directed flange has an upturned lip at a peripheral edge thereof.

5. A fluid-operated diaphragm spring brake actuator according to claim 4 wherein the flared portion has a seat intermediate the tubular portion and the radially outwardly directed flange.

6. A fluid-operated diaphragm spring brake actuator according to claim 5 wherein the actuator rod is hollow.

7. A fluid-operated diaphragm spring brake actuator according to claim 6 wherein the tubular portion has an aperture.

8. A fluid-operated diaphragm spring brake actuator according to claim 7 further comprising a caging tool extending through the aperture and into the actuator rod.

9. A fluid-operated diaphragm spring brake actuator according to claim 2 wherein the flared portion has a seat intermediate the tubular portion and the radially outwardly directed flange.

10. A fluid-operated diaphragm spring brake actuator according to claim 1 wherein the tubular portion has an aperture.

11. A fluid-operated diaphragm spring brake actuator according to claim 10 wherein the actuator rod is hollow.

12. A fluid-operated diaphragm spring brake actuator according to claim 11 further comprising a caging tool extending through the aperture and into the actuator rod.

13. A fluid-operated diaphragm spring brake actuator according to claim 1 wherein the flared portion has an upturned lip to prevent the flared portion from catching the diaphragm.

14. A fluid-operated diaphragm spring brake actuator according to claim 1 wherein the flared portion has a seat for the spring.

15. A fluid-operated diaphragm spring brake actuator according to claim 1 wherein the actuator rod is press fit within the tubular portion.

16. In a fluid-operated diaphragm spring brake actuator, having a service brake actuator in combination with a spring brake actuator, the service brake actuator having a 2housing, an elastomeric service diaphragm suspended in the housing to divide the interior thereof into a first service chamber and a second service chamber, a service housing pressure plate in the second service chamber adjacent the service diaphragm, a push rod abutting the service pressure plate and connected to a brake mechanism; the spring brake actuator having a housing, an elastomeric spring diaphragm suspended in the housing to divide the interior thereof into a first spring chamber and second spring chamber, a spring pressure plate adjacent to the spring diaphragm in the first spring chamber, a spring in the first spring chamber between the spring pressure plate and the housing, and an actuator rod in the second spring chamber for actuating the brake mechanism in response to movement of the spring diaphragm and spring pressure plate, the actuator extending into the first spring service chamber and contacting the service diaphragm, the improvement wherein:

the spring pressure plate has a tubular portion adjacent to the actuator rod at an end of the actuator rod in the first spring chamber and a flared portion extending obliquely away from the tubular portion.

17. In a fluid-operated diaphragm spring brake actuator having a housing with first and second opposing walls, an elastomeric diaphragm suspended in the housing to divide the interior of the housing into first and second chambers, the first wall partially defining the first chamber and the second wall partially defining the second chamber, a pressure plate in the first chamber and adjacent to the diaphragm, a spring in the first chamber between the pressure plate and the first wall, and an actuator rod in the second chamber for actuating a brake mechanism in response to movement of the diaphragm and the pressure plate from a retracted position, the improvement wherein:

the pressure plate generally has the shape of a hollow cone with a vertex pointed toward the first wall and a flared portion extending generally toward the second wall, the area of the flared portion forming a significant part of the total surface area of the pressure plate, wherein a portion of the diaphragm generally follows the contour of the pressure plate with the actuator rod being received within the hollow of the cone whereby to minimize the maximum volume of fluid in the second chamber when the diaphragm and pressure plate are in the retracted position.

18. A fluid-operated diaphragm spring brake according to claim 17 wherein the vertex is tubular and the diaphragm has an aperture, the actuator rod extending through the aperture and into the tubular vertex.

19. A fluid-operated diaphragm spring brake according to claim 17 wherein the flared portion terminates in a radial flange.

20. A fluid-operated diaphragm spring brake actuator according to claim 19 wherein the flared portion has a seat located in the first chamber for supporting the spring.

* * * * *